(12) United States Patent
Darr et al.

(10) Patent No.: US 7,491,420 B2
(45) Date of Patent: Feb. 17, 2009

(54) METHOD OF MANUFACTURING A PLASTIC CONTAINER

(75) Inventors: Richard C. Darr, Medina, OH (US); Marc A. Pedmo, Brunswick, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 11/653,665

(22) Filed: Jan. 16, 2007

(65) Prior Publication Data

US 2007/0172615 A1  Jul. 26, 2007

Related U.S. Application Data

(62) Division of application No. 11/337,295, filed on Jan. 23, 2006, now abandoned.

(51) Int. Cl.
*B05D 7/22* (2006.01)
*B05D 5/00* (2006.01)
*B65D 23/02* (2006.01)

(52) U.S. Cl. .................... 427/230; 427/238; 427/407.1; 427/412.1

(58) Field of Classification Search ................ None
See application file for complete search history.

(56) References Cited

U.S. PATENT DOCUMENTS

| 5,143,763 A * | 9/1992 | Yamada et al. ............. 428/36.2 |
| 6,461,699 B1 * | 10/2002 | Slat et al. .................. 428/35.7 |
| 2003/0235667 A1 * | 12/2003 | Darr et al. .................. 428/35.7 |

* cited by examiner

*Primary Examiner*—William Phillip Fletcher, III
(74) *Attorney, Agent, or Firm*—Dykema Gossett PLLC

(57) ABSTRACT

Forming a plastic container having a base portion adapted to support the container, a cylindrical sidewall projecting upwardly from the base, and a neck finish projecting upwardly from the sidewall and having an opening to the inside of the container. The container is formed with a molded outer layer with inner and outer surfaces and an inner layer extending over the inner surface of the sidewall and base, with the neck finish free from the inner layer. The outer layer is formed with at least one oxygen scavenger material that reacts with oxygen, and the inner layer includes at least one oxygen barrier material.

16 Claims, 5 Drawing Sheets

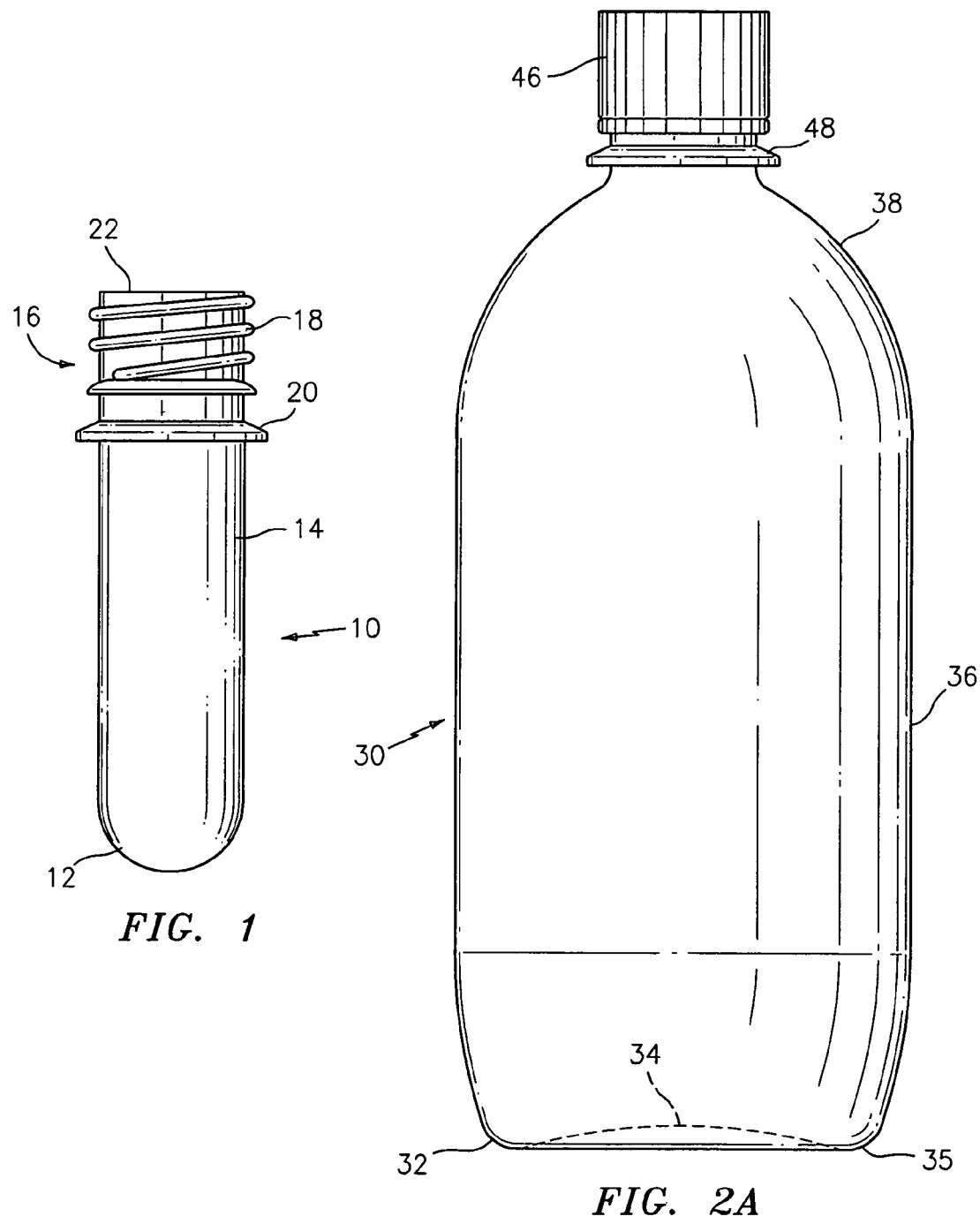

METHOD OF MANUFACTURING A PLASTIC CONTAINER

CROSS-REFERENCE TO RELATED APPLICATION

This application is a division of U.S. patent application Ser. No. 11/337,295, filed Jan. 23, 2006 now abandoned.

TECHNICAL FIELD

The present invention relates to plastic containers, especially blow molded plastic containers. More particularly, the present invention relates to plastic containers having high barrier properties.

BACKGROUND ART

Plastic containers are commonly used for packaging items in a wide range of fields, including food and beverage, medicine, health and beauty, and home products. Plastic containers are known for being easily molded, cost competitive, lightweight, and generally suitable for many applications.

Because plastic containers may permit low molecular gases, such as oxygen and carbon dioxide, to slowly permeate through their physical configurations, the use of plastic containers sometimes proves to be less desirable when compared to containers formed from other less permeable materials, such as metal or glass. In most applications, the shelf life of the product contents is directly related to the package's ability to effectively address such molecular permeation. In the case of carbonated beverages, such as beer, oxygen in the atmosphere surrounding the container can gradually permeate inwardly through the plastic walls of the container to reach inside of the container and deteriorate the contents. Likewise, carbon dioxide gas associated with the contents may permeate outwardly through the plastic walls of the container until eventually being released on the outside, causing the carbonated beverage to lose some of its flavor and possibly become "flat".

To address some of the foregoing concerns, plastic container manufacturers have utilized various techniques to reduce or eliminate the absorption and/or permeability of such gases. Some of the more common techniques include: increasing the thickness of all or portions of the walls of the container; incorporating one or more barrier layers into the wall structure; including oxygen-scavenging or reacting materials within the walls of the containers; and applying various coatings to the internal and/or external surface of the container. However, conventional barrier and/or scavenger materials will frequently not effectively curtail the permeation of both oxygen and carbon dioxide over extended periods of time.

It is preferred to have a plastic container with high barrier properties to prevent oxygen ingress and carbonation egress from occurring. Barrier treatment on the internal surface of the plastic container, as for example, carbon treatment, prevents most oxygen from entering the container. A typical 16 oz. carbon coated plastic container has oxygen ingress of from 0.0010 to 0.0060 cc/package/day. This is a high barrier compared to a typical untreated polyethylene terephthalate (PET) container which is typically in the range of 0.0400 to 0.0600 cc/package/day.

However, in some circumstances it is desirable to have less than the 0.0010 to 0.0060 cc/package/day oxygen ingress and for these applications an oxygen scavenger may be used in the plastic structure in combination with the barrier treatment. For example, the structure may consist of an oxygen scavenger in a mono-layer plastic structure with a carbon coating on the inside surface. This will allow the container to reduce the oxygen ingress to less than 0.0010 to 0.0060 cc/package/day through the container sidewall. However, disadvantageously the closure will typically allow more oxygen to permeate through into the container than is desirable. A barrier on the internal surface of the container will prevent the scavenger from scavenging oxygen which comes through the closure.

Therefore, a need exists and it is an object of the present invention to provide an improved plastic container including oxygen scavenging materials and barrier materials suitable for holding products, such as carbonated beverages or other food products, and having a long shelf life.

It is a further object of the present invention to provide an improved plastic container as aforesaid which overcomes the problem of oxygen ingress through the container.

Further objects and advantages of the present invention will appear hereinbelow.

SUMMARY OF THE INVENTION

In accordance with the present invention the foregoing objects and advantages are readily obtained.

The present invention particularly takes into consideration the oxygen ingress through the closure and allows the oxygen scavenger inside the plastic wall to consume the oxygen that permeates the closure. On a typical container with its internal surface barrier coated, as with a carbon coating, the internal coating prevents the scavenger inside the plastic wall from scavenging the oxygen that has penetrated the closure due to its high barrier properties. Thus, the oxygen inside the container becomes trapped and cannot be consumed by the scavenger in the container wall due to the barrier coating between the scavenger and the trapped oxygen.

In accordance with the present invention the foregoing problem has been overcome.

The present invention provides a container which comprises:

a plastic container, preferably a blow molded plastic container, having a base portion adapted to support the container, a cylindrical sidewall projecting upwardly from the base portion, and a neck finish projecting upwardly from the cylindrical sidewall and having an opening to the inside of the container;

said container further comprising a molded outer layer having an inner surface and an outer surface, with an inner layer extending over the inner surface of the cylindrical sidewall and base portion, wherein the neck finish is free from the inner layer; and wherein the outer layer contains at least one oxygen scavenging material that reacts with oxygen, and the inner layer includes at least one oxygen barrier material.

The outer layer is preferably a mono-layer plastic material, but can be a multi-layer plastic material. The inner layer is preferably a non-structural, amorphous carbon coating. The container generally includes a shoulder portion which extends inwardly between the cylindrical sidewall and neck portion, wherein the inner layer extends over the shoulder portion.

Thus, the container of the present invention provides for the inner layer to extend over the entire inner surface of the container with the exception of the neck finish area, while the oxygen scavenger extends over the entire container. The oxygen scavenger in the neck area, therefore, can consume any oxygen that penetrates the closure since the inner layer is not present in the neck area. The neck finish is typically the thickest cross-section of the container and therefore will contain a higher percentage of scavenger per square inch than any other location on the container. In view of this it is highly advantageous to leave the neck finish area without inner layer barrier treatment and permit this area to scavenge oxygen that penetrates the closure.

Further features of the present invention will appear hereinbelow.

BRIEF DESCRIPTION OF THE DRAWINGS

The present invention will be more readily understandable from the following illustrative drawings, wherein:

FIG. 1 is an elevational view of a preform for forming a container in accordance with the present invention;

FIG. 2A is an elevational view of a container of the present invention;

DETAILED DESCRIPTION OF PREFERRED EMBODIMENTS

Figure 2B:
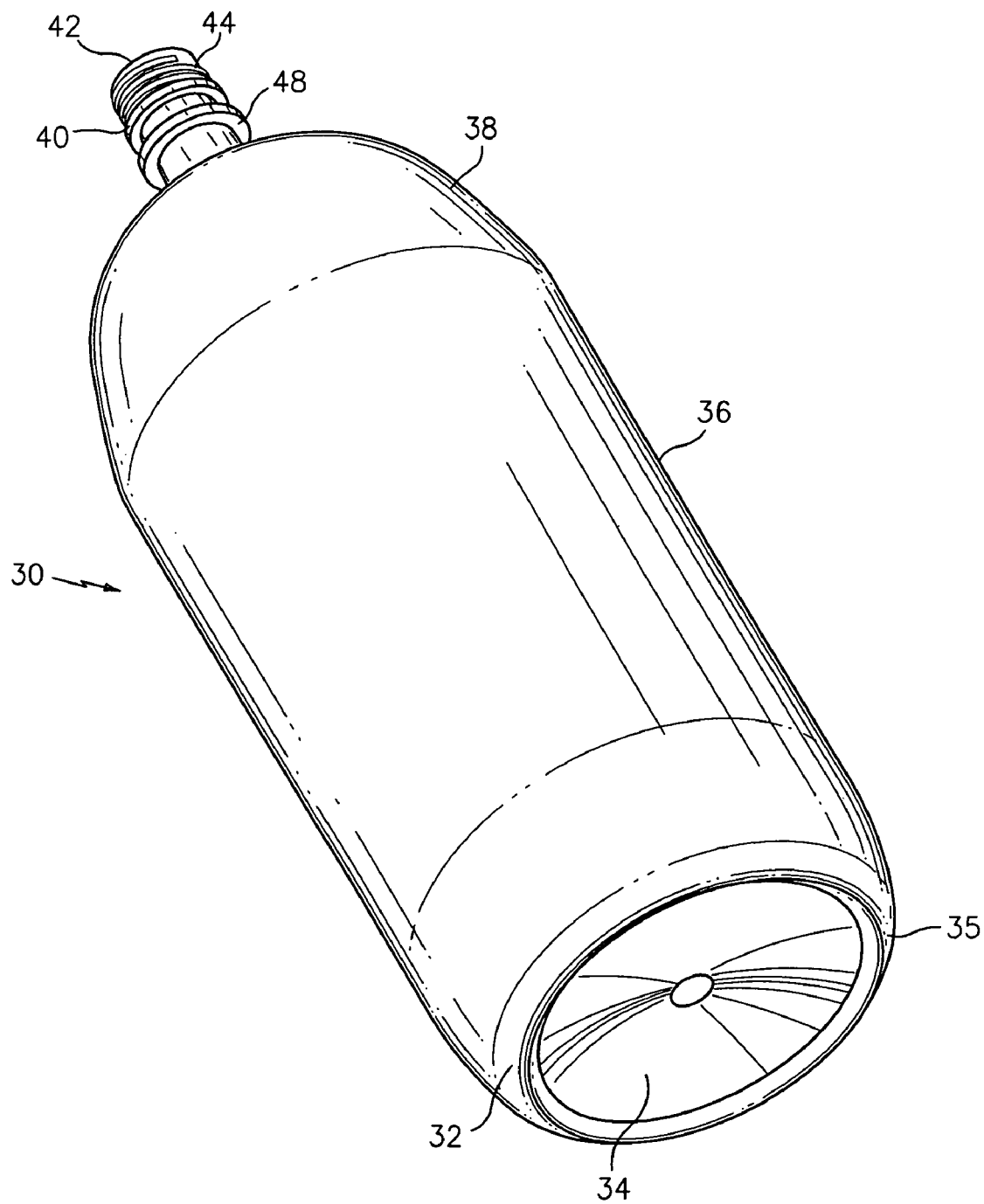
FIG. 2B is a perspective view of the container of FIG. 2A.

Referring to the drawings in detail, FIG. 1 is an elevational view of preform 10 adapted to be blow molded into a container in accordance with the present invention, such as container 30 shown in FIGS. 2A and 2B. Preform 10 preferably includes a base portion 12, a vertical intermediate portion 14 extending upwardly from the base portion, and an upper portion 16 extending upwardly from the intermediate portion and having upper threads 18, an outwardly extending flange 20 beneath the threads, and an opening 22 above the threads to the inside of the preform.

FIGS. 2A and 2B show a representative container 30 which is formed from preform 10 by a blow molding operation. Container 30 has a base portion 32 which is adapted to support the container. The base may include an indented or inwardly depressed center portion 34 and a circumferential encircling portion 35 as clearly shown in FIG. 2B. A cylindrical sidewall 36 projects upwardly from the base and may include a shoulder portion 38 which extends upwardly and inwardly from the sidewall and neck finish 40 projects upwardly from the sidewall and shoulder and having an uppermost opening 42 to the inside of the container. The neck finish 40 includes a threaded portion 44 (FIG. 2B) for a closure 46 (FIG. 2A) and an outwardly extending flange 48 beneath the threaded portion. Naturally, variations in the container shape and configuration are contemplated, as, for example, the alternate containers shown herein, or alternate sidewall configurations as with circumferential depressions or the like, or different base configurations.

Figure 3:
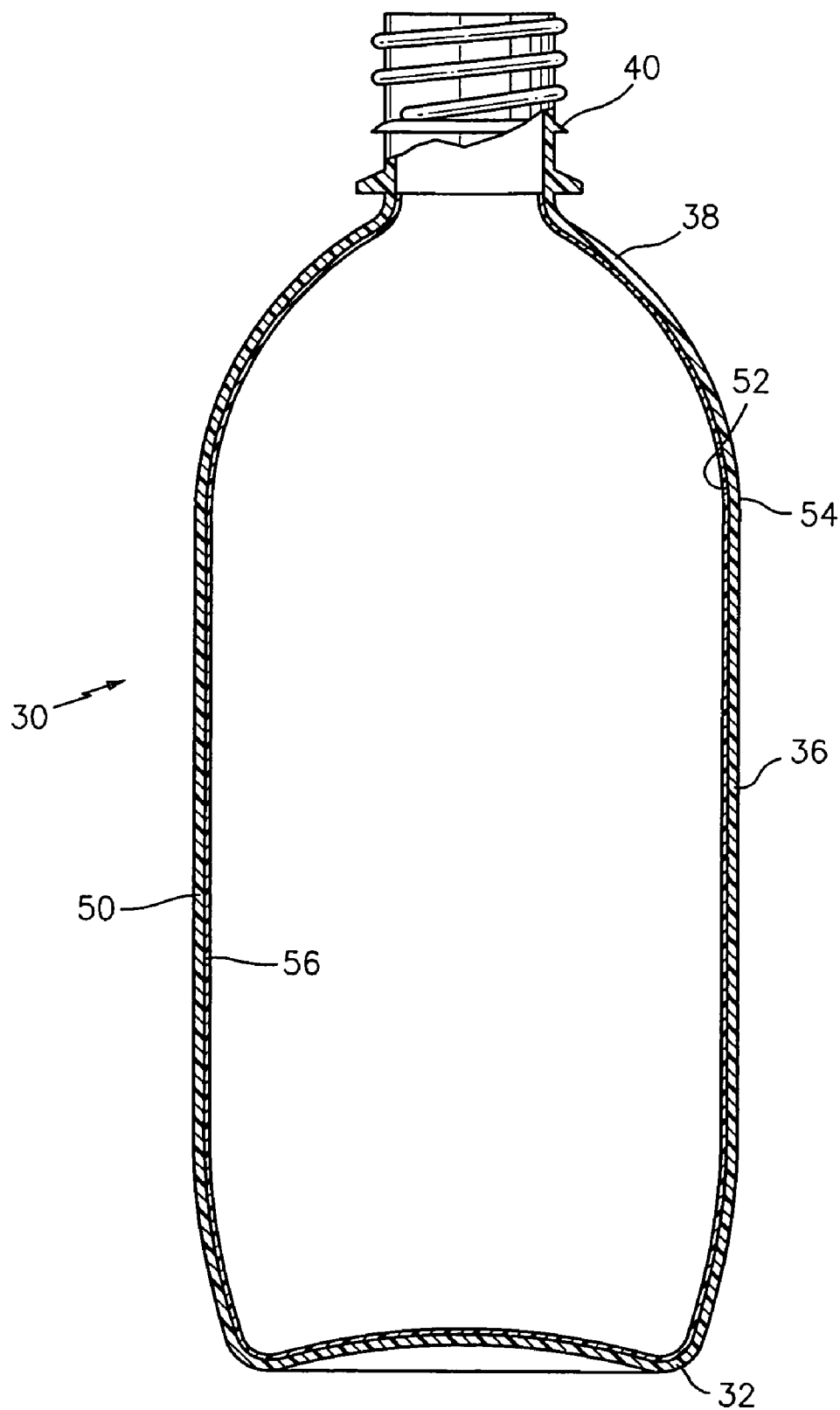
FIG. 3 is a partial cross-sectional view of the container of FIG. 2A.

FIG. 3 is a partial cross-sectional view of the container 30 of FIGS. 2A and 2B and shows a molded outer plastic layer 50 having an inner surface 52 and an outer surface 54, and an inner layer 56 extending over the inner surface 52 of the outer layer 50. The inner layer 56 extends over base portion 32, sidewall 36 and shoulder portion 38, but does not extend over the neck finish 40, i.e., the neck finish 40 is free from the inner layer 56.

The molded outer layer 50 is desirably comprised of a thermoplastic material. The following resins as well as others may be conveniently used as plastic materials for the outer layer: polyethylene resin, polypropylene resin, polystyrene resin, cycloolefine copolymer resin, polyethylene terephthalate resin, polyethylene naphthalate resin, ethylene-(vinyl alcohol) copolymer resin, poly-4-methylpentene-1 resin, poly(methyl methacrylate) resin, acrylonitrile resin polyvinyl chloride resin, polyvinylidene chloride resin, styrene-acrylo nitrile resin, acrylonitrile-butadien-styrene resin, polyamide resin, polyamideimide resin, polyacetal resin, polycarbonate resin, polybutylene terephthalate resin, ionomer resin, polysulfone resin, polytetra fluoroethylene resin and the like.

The outer layer is a plastic layer that contains an oxygen scavenging material throughout the entire outer layer. Oxygen scavenging materials are well known and include materials marketed for such a purpose by several large oil companies and resin manufacturers. A specific example of such a material is marketed under the trade name AMOSORB and is commercially available from the Amoco Corporation. Polyolefin oligomer segments are prepared for copolycondensation by first functionalizing the polyolefin oligomer segments with end groups capable of entering into polycondensation reactions. The polyolefin oligomers are, in effect, addition polymers. Functionalization of the polyolefin oligomers with end groups affords a convenient method for incorporation of addition polymer segments into a copolycondensate. A preferred polyolefin oligomer as an oxygen scavenger in the present invention is polybutadiene because it has good oxygen scavenging capacity and reacts quickly with oxygen especially in the presence of a transition metal catalyst, such as cobalt, and in the presence of benzophenone, or both cobalt and benzophenone.

The inner layer is desirably made of or includes at least one barrier material. The barrier material is desirably an oxygen barrier and may, for example, by formed from PEN, saran and ethylene vinyl alcohol copolymers (EVOH) or acrylonitrile copolymers, such as Barex. The term saran is used in its normal commercial sense to contemplate polymers made for example by polymerizing vinylidene chloride and vinyl chloride or methyl acrylate. Additional monomers may be included as is well known. Vinylidene chloride polymers are commonly used, but other oxygen barrier materials are well known. In a preferred embodiment the inner layer is a non-structural, amorphous carbon coating. Thus, the inner surface 52 of the outer layer 50 is preferably coated with a thin layer of carbon which provides enhanced barrier properties. Preferably, the carbon coating 56 is comprised of a highly hydrogenated, amorphous carbon that is doped with nitrogen. The inner layer preferably has a thickness of from 0.5 to 10 microns, whereas the outer layer preferably has a thickness of from 6 to 23 mils.

It is preferred to have a container with high barrier properties to prevent oxygen ingress and carbonation egress from occurring. Barrier treatment on the internal surface of the container as described above, particularly carbon treatment, prevents most oxygen from entering the container. For example, a typical 16 oz. container with internal carbon coating has an oxygen ingress of 0.0010 to 0.0060 cc/pkg/day. This is a high barrier compared for example to untreated polyethylene terephthalate (PET) which is typically in the range of 0.0400 to 0.0600 cc/pkg/day. However, there are circumstances where it is desired to have less than the 0.0010 to 0.0060 cc/pkg/day oxygen ingress and for these applications one can use an oxygen scavenger in the plastic layer, as in a mono-layer plastic container as described above, prior to the inner layer barrier treatment. The structure of an oxygen scavenger in the plastic layer with, for example, a carbon coating on the inside surface of the plastic layer allows the container to reduce the oxygen ingress through the sidewall of the container to less than 0.0010 to 0.0060 cc/pkg/day through the container sidewall. However, the closure for the container typically will allow more oxygen through and into the container than is desirable.

On a typical container with an internal barrier coating, the internal coating prevents the oxygen scavenger in the plastic layer from scavenging the oxygen that has penetrated the closure due to the barrier properties of the internal layer. Thus, the oxygen in the container becomes trapped and cannot be consumed by the scavenger in the sidewall of the container due to the treatment on the inside of the container. This is clearly disadvantageous.

Figure 5:
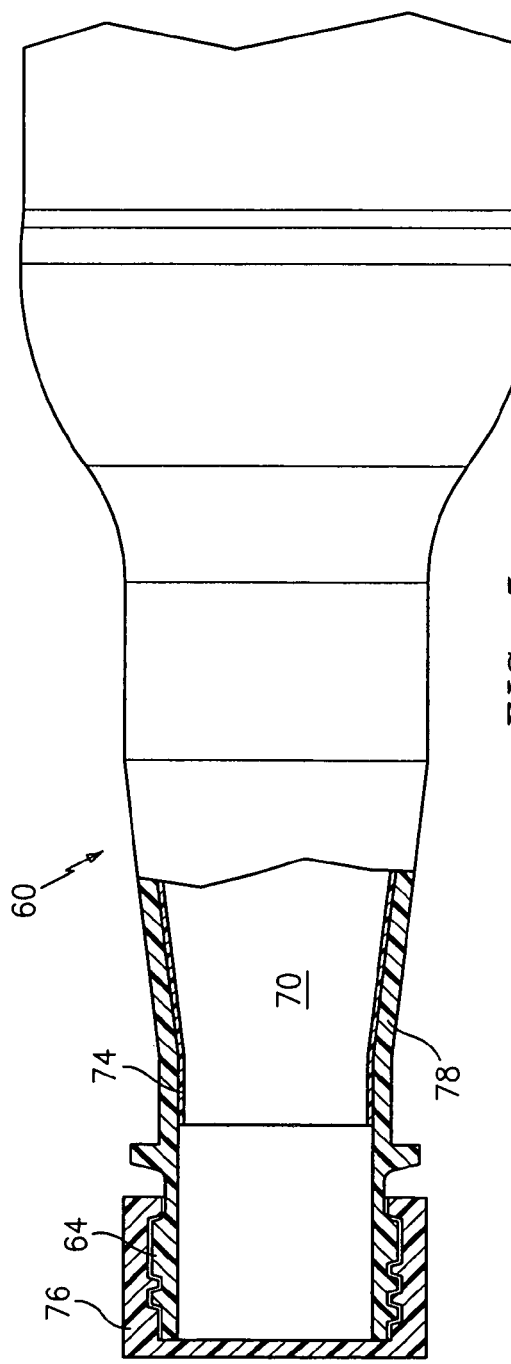
FIG. 5 is a partially broken away elevational view of the upper portion of the container of FIG. 4 after formation of the inner layer.

The present invention takes into consideration the oxygen trapped in the container as by ingress through the closure and permits the oxygen scavenger in the plastic layer to consume trapped oxygen. Thus, the present invention allows the internal barrier coating to target a specific area of the container, namely, the body of the container, while leaving the inside of the neck area untreated. The oxygen scavenger can then consume any oxygen that is trapped within the container during the filling operation or that penetrates the closure. The neck finish is a highly desirable location to leave untreated with a barrier as it is adjacent the closure which is subject to oxygen ingress. Also, the neck finish typically has the thickest cross-section of the container and thus contains a higher percentage of oxygen scavenger per location than any other location on the container. In addition, if desired, one can include additional oxygen scavenger on or adjacent the inside surface of the closure, as in a plastic closure or in an internal seal member, as on closure 46 or closure 76 in FIG. 5, to supplement the scavenger in the outer layer.

Figure 4:
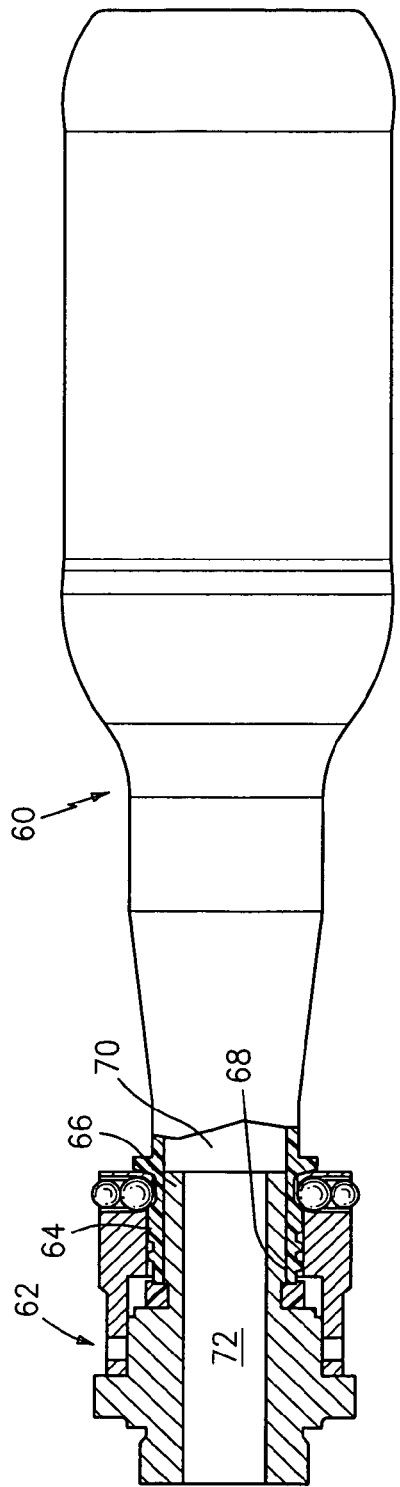
FIG. 4 is a partially broken away elevational view of an alternate embodiment of a container of the present invention including a vacuum nozzle assembly for forming the inner layer.

FIG. 4 shows a representative treatment assembly for forming the inner layer, as preferably an internal carbon coating. Thus, container 60 is provided with a vacuum nozzle assembly 62 engaging the neck finish 64 of the container, said assembly having an extended nozzle base 66 covering the internal surface 68 of neck finish 64. The carbon treatment enters the inside 70 of container 60 through assembly channel 72 coating the inside of the container with the carbon layer while leaving the neck finish 64 uncoated due to the extended nozzle base 66. The result is clearly shown in FIG. 5, where container 60 has internal carbon coating 74 which extends up to neck finish 64 while leaving the neck finish uncoated. Thus, oxygen entering container 60 through closure 76 or which is trapped in the upper portion of the container is free to be absorbed by the oxygen scavenger in the outer layer 78 without being blocked by the internal barrier layer.

Figure 6:
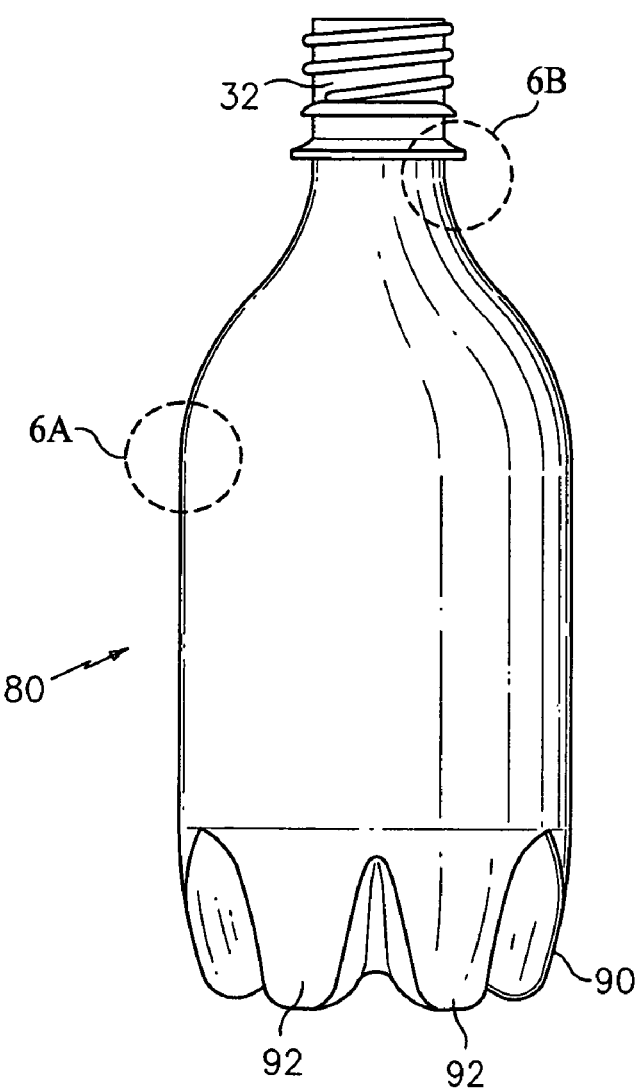
FIG. 6 is an elevational view of an alternate embodiment of the container of the present invention.
Figure 6A:
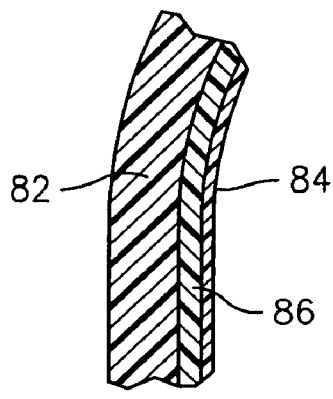
FIG. 6A is an enlarged cross-sectional view of area 6A of FIG. 6.
Figure 6B:
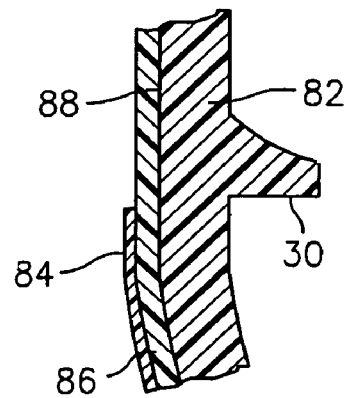
FIG. 6B is an enlarged cross-sectional view of area 6B of FIG. 6.

FIGS. 6, 6A and 6B show an alternate container 80 with a multi-layer plastic outer layer, namely, an outermost layer 82 which may contain the oxygen scavenger, an inner barrier layer 84, preferably a carbon coating, and a central layer 86, which if desired can be multiple central layers. The barrier extends up to the neck finish 88 but does not cover same as previously described. The multi-layer container permits one, for example, to obtain differing characteristics in the walls of the container based on the multiple layers. Base portion 90 is shown to include a plurality of legs 92 for support.

It is to be understood that the invention is not limited to the illustrations described and shown herein, which are deemed to be merely illustrative of the best modes of carrying out the invention, and which are susceptible to modification of form, size, arrangement of parts and details of operation. The invention rather is intended to encompass all such modifications which are within its spirit and scope as defined by the claims.

What is claimed is:

1. A method which comprises:
   forming a plastic container having a base portion adapted to support the container, a cylindrical sidewall projecting upwardly from said base portion, and a neck finish projecting upwardly from said cylindrical sidewall and having an opening to the inside of the container, wherein said container includes a molded outer layer having an inner surface and an outer surface, where said outer layer extends over the base portion, cylindrical sidewall and neck finish of said container; and
   forming an inner layer over the inner surface of the outer layer, wherein the neck finish is free from the inner layer, including the steps of providing that the outer layer contains at least one oxygen scavenger that reacts with oxygen, and that the inner layer includes at least one barrier material, wherein the neck finish is free from the barrier material included in the inner layer, and including providing that the outer layer has a thickness of from 6 to 23 mils, and the inner layer has a thickness of from 0.5 to 10 microns.

2. The method of claim 1, including the step of providing that the inner layer is a non-structural, amorphous carbon coating.

3. The method of claim 1, including the steps of forming said container to include a shoulder portion which extends inwardly between the sidewall and the neck finish, and extending the inner layer at least in part over the shoulder portion.

4. The method of claim 2 including the steps of covering the inner surface of the outer layer at the neck finish, and forming said carbon coating on the inner surface of the container while the inner surface of the neck finish is covered, thereby leaving the neck finish free from carbon coating.

5. The method of claim 4, including forming the inner layer with a vacuum nozzle which engages the neck finish of the container.

6. The method of claim 1, including forming a blow molded container.

7. The method of claim 1, including providing that the outer layer is a mono-layer plastic material.

8. The method of claim 1, including providing that the outer layer is a multi-layer plastic material.

9. The method of claim 1, including providing that the neck finish includes a threaded portion beneath the opening and an outwardly extending flange beneath the threaded portion.

10. The method of claim 1, including providing that the base portion includes a circumferential encircling member and an indented center.

11. The method of claim 1, including providing said container with a shoulder portion which extends inwardly between the sidewall and neck finish, wherein the inner layer extends at least in part over the shoulder portion.

12. The method of claim 1, including providing that the oxygen scavenger contains polyolefin oligomer segments.

13. The method of claim 1, including providing that the oxygen scavenger contains polybutadiene.

14. The method of claim 1, including providing that the barrier material is an oxygen barrier.

15. The method of claim 1, including providing a closure over the neck finish.

16. The method of claim 15, including providing that the inside surface of the closure includes at least one oxygen scavenger that reacts with oxygen.

* * * * *